United States Patent

[11] 3,612,503

| [72] | Inventor | Gene S. Tanno<br>3451 Rosedale Drive, San Jose, Calif. 95117 |
|---|---|---|
| [21] | Appl. No. | 762,903 |
| [22] | Filed | Sept. 26, 1968 |
| [45] | Patented | Oct. 12, 1971 |

[54] VEHICLE STABILIZER DEVICE
5 Claims, 12 Drawing Figs.

| [52] | U.S. Cl. | 267/11 |
|---|---|---|
| [51] | Int. Cl. | B60g 21/04 |
| [50] | Field of Search | 280/104, 112.1; 267/11, 12, 13 |

[56] References Cited
UNITED STATES PATENTS

| 2,269,385 | 1/1942 | Tipton | 267/11 |
|---|---|---|---|

FOREIGN PATENTS

| 621,468 | 2/1927 | France | 267/11 |
| 164,707 | 1/1934 | Switzerland | 267/11 |
| 363,856 | 12/1931 | Great Britain | 267/11 |

Primary Examiner—Philip Goodman
Attorney—John J. Leavitt

ABSTRACT: A vehicle stabilizer device is presented that is particularly useful for automobile and trucks, but which is applicable in a broad sense to any kind of vehicle that requires or which would benefit from stabilization between a chassis and running gear supporting the chassis. The stabilizer device of the invention provides a pair of beams, each of which is connected to an associated one of the frame members of the chassis, with the opposite end of that beam being connected to the running gear associated with the opposite frame member of the chassis. Intermediate their ends the beams are juxtaposed and interconnected by a pivotal and slidable union which permits a scissoring action between the beams when forces are imposed thereon. Such scissoring action cooperates with the inherent resilience of the beams to stabilize relative movement between the chassis and the running gear of the vehicle.

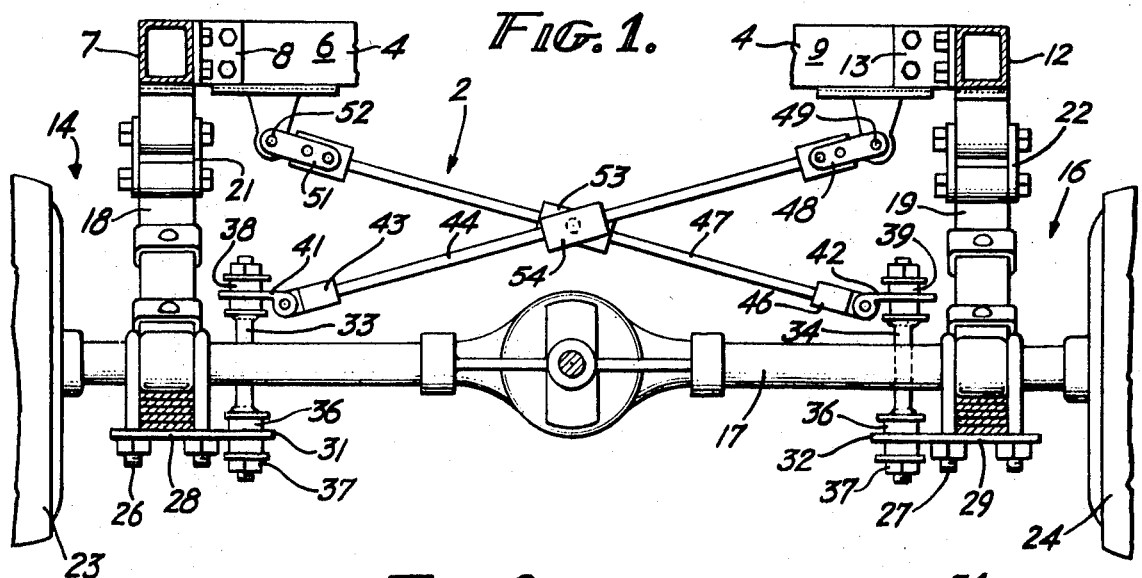
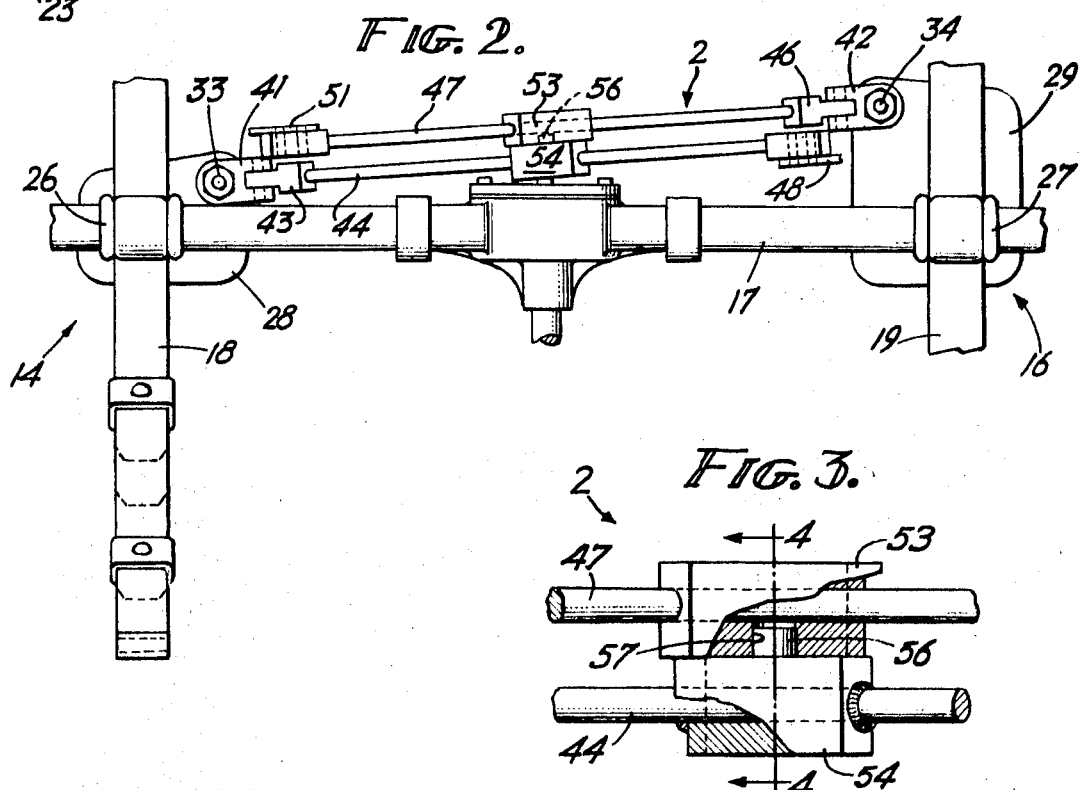
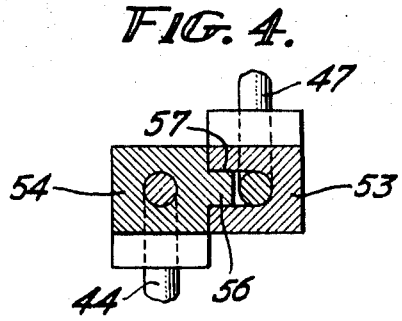

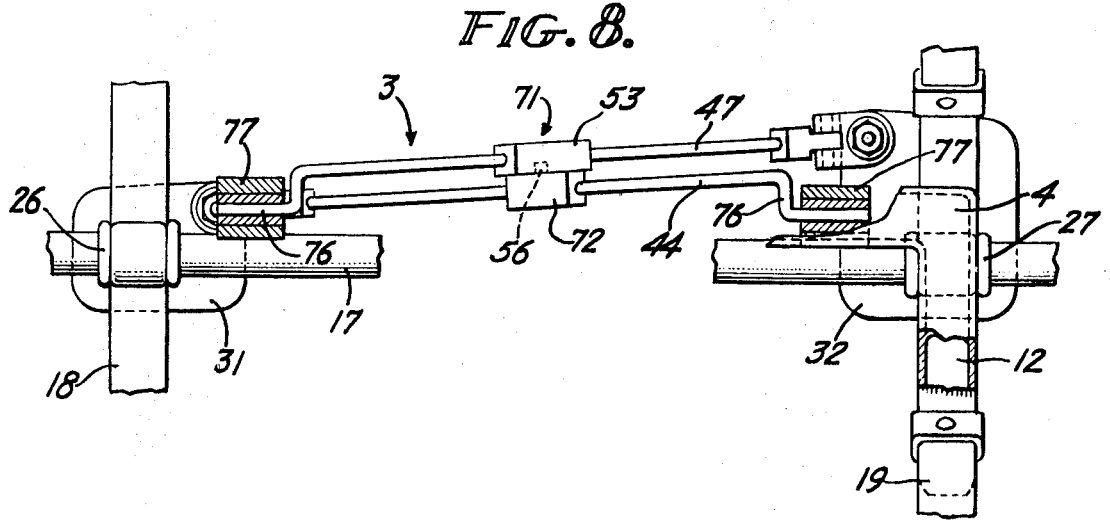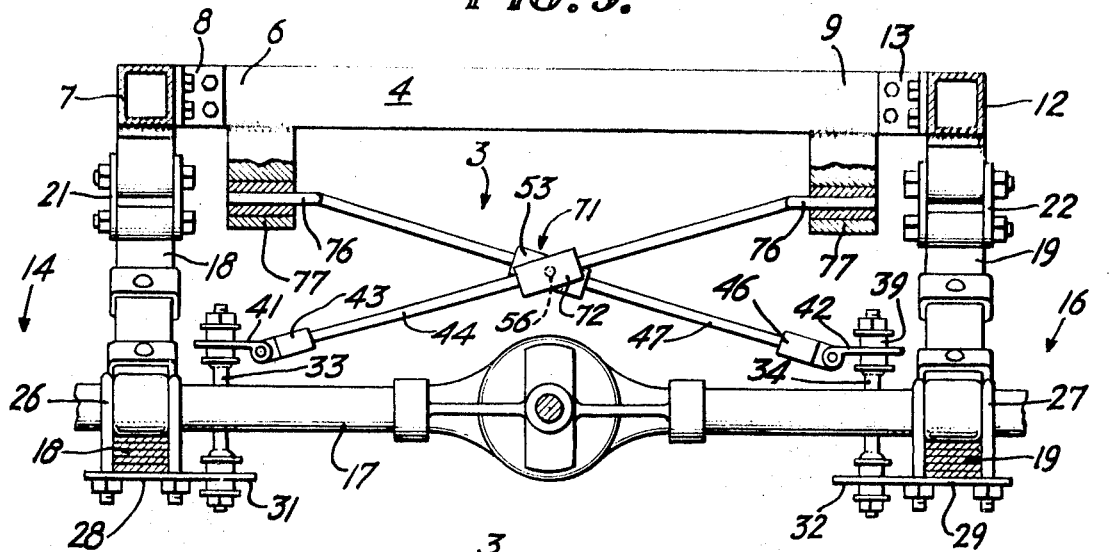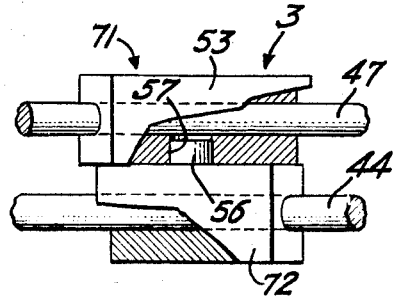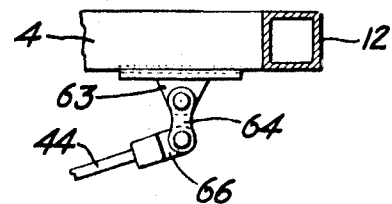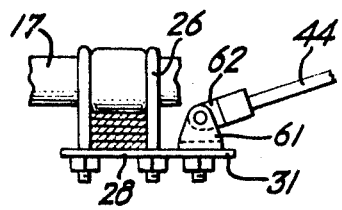

VEHICLE STABILIZER DEVICE

BACKGROUND OF INVENTION

In modern day vehicles, various systems are used for attaching the running gear of the vehicle below the chassis thereof. Thus, in some makes of automobiles, the conventional leaf-type spring assembly is interposed between the rear axle housing and the frame members. In other makes of automobiles a heavy coil spring with appropriate shock-absorbing means is interposed between each of the wheels and the associated frame member of the chassis. It is understood that in a relatively few makes of vehicles torsion bars are interposed between the chassis and the running gear to damp vibrations and impact shocks so that they do not reach the chassis or are greatly diminished. So far as I have been able to determine, in none of these spring or shock absorber assemblies has a provision been made to stabilize the attitude of the chassis in space with respect to the running gear in opposition to the unstabilizing effects of centrifugal force and gravity, as when the car is cornering rapidly. It is accordingly one of the objects of the invention to provide a vehicle stabilizer device which is effective to counteract the unstabilizing effects of centrifugal force by maintaining in substantial equilibrium the relative positional relationship between the chassis and the running gear.

In most modern day automobiles and other vehicles, when the vehicle corners rapidly, the imposition of centrifugal force causes the center of gravity of the vehicle to shift in the direction in which the centrifugal force is applied. Such shifting of the center of gravity results from the spring assemblies associated with the outboard running gear being compressed, thus permitting the chassis frame member associated with this running gear to move closer to the running gear or closer to the ground. Simultaneously, the chassis frame member associated with the inboard running gear moves away from that running gear, thus causing the automobile body to tip in the direction of application of the centrifugal force. The faster the turn is made the more centrifugal force will be imposed and greater will be the disalignment between running gear and chassis. Such disalignment leads to difficulty in maintaining control of the vehicle. Accordingly, it is one of the objects of the invention to provide a vehicle stabilizer device that acts to counteract the effects of centrifugal force by imposing a resilient restrictive force between the inboard and outboard running gear and the associated chassis frame members, thus tending to prevent disalignment between these members.

When a vehicle corners at speed, one of the effects of centrifugal force, caused largely by the shift of the center of gravity of the automobile, is to reduce the traction between the roadbed and the inboard running gear. Accordingly, it is another object of the invention to provide a vehicle stabilizer device which is effective to reduce the amount of traction lost by the inboard wheels of a vehicle as it corners.

The suspension systems of most modern day automobiles combine the function of a spring, whether leaf-type or coil-type to provide a soft ride, with the function of a shock absorber to absorb sharp impact shocks of short duration such as those imposed by irregularities in the roadbed. It is a still further object of the invention to provide a vehicle stabilizer device capable of performing both these functions.

A still further object of the invention is to provide a vehicle stabilizer device which may be sold as a unit for installation on existing automobiles or other vehicles.

The invention possesses other objects and features of advantage, some of which, with the foregoing, will become apparent from the following description and the drawings. It is to be understood however that the invention is not limited to the embodiments illustrated and described, as it may be embodied in various forms within the scope of the appended claims.

BRIEF SUMMARY OF DISCLOSURE

In terms of broad inclusion, the vehicle stabilizer device of the invention comprises an assembly that is applicable to a vehicle chassis having a pair of rigidly interconnected spaced frame members and running gear including a pair of wheels and a suspension system for each wheel operatively associated with an associated frame member to accommodate relative movement therebetween. The stabilizer device or assembly, in combination with this structure, comprises a pair of juxtaposed elongated beams, each beam of the pair having one end pivotally anchored to an associated one of the frame members and its other end pivotally anchored to the running gear associated with the other frame member of the pair. Intermediate their ends, the beams are interconnected to permit movement of the beams in a scissoring action relative to each other. Such interconnection includes both a pivotal and slidable union between the beams, with the interconnecting means in one embodiment of the invention being free to move toward one or the other end of each beam, depending upon the tendency of the vehicle chassis to realign itself with the running gear. In another embodiment, the pivotal point is fixed in relation to the ends of one of the beams, and slidable in respect to the ends of the other beam.

DESCRIPTION OF DRAWINGS

FIG. 1 is a rear elevation of an automobile chassis illustrating one embodiment of the stabilizer device attached thereto and to the associated running gear.

FIG. 2 is a plan view of the embodiment illustrated in FIG. 1.

FIG. 3 is a horizontal cross-sectional view through the interconnecting means of FIGS. 1 and 2 uniting the stabilizer beams intermediate their ends.

FIG. 4 is a vertical cross-sectional view through the interconnecting means illustrated in FIGS. 1 and 2, taken along the line 4—4 in FIG. 3.

FIG. 8 is a plan view similar to FIG. 2, but illustrating a modified embodiment of the stabilizer device which utilizes moments of rotation to impose torsional forces as well as lever forces to effect stabilization between the chassis and running gear.

FIG. 9 is a rear elevation of the embodiment of the invention illustrated in FIG. 8.

FIG. 10 is a horizontal cross-sectional view similar to FIG. 3, but illustrating a different embodiment of the interconnecting means between the beams in which a slide bearing is used on each beam with a pivotal connection therebetween.

FIG. 11 is a fragmentary view illustrating a modified means for connecting the stabilizer beams to the running gear.

FIG. 12 is a fragmentary view illustrating a modified means for connecting the stabilizer beams to the chassis.

DESCRIPTION OF PREFERRED EMBODIMENT

Figure 5:
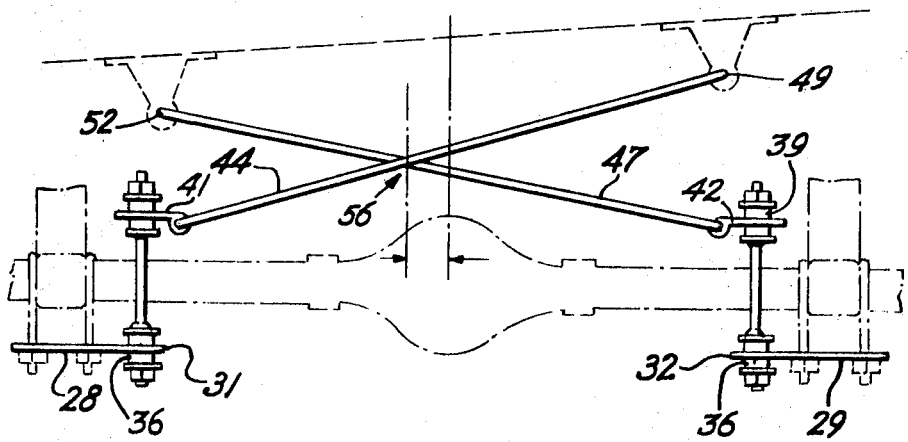
FIG. 5 is a schematic illustration similar to FIG. 1 but showing the relationship of the crossed stabilizer beams on a turn to the right if the beams are unconnected intermediate their ends.

In terms of greater detail, the vehicle stabilizer device of the invention in one of its embodiments comprises an assembly designated generally by the numeral 2, reference being had to FIGS. 1, 2 and 3. In another embodiment of the invention the vehicle stabilizer device comprises the assembly illustrated in FIGS. 8, 9 and 10 and designated generally by the numeral 3.

Referring to the embodiment illustrated in FIGS. 1, 2 and 3, the assembly 2 includes a crossmember 4 one end 6 of which is attached to left frame member 7 through an angle bracket 8, while the other end 9 of the crossmember is suitably attached to right frame member 12 through a similar angle bracket 13. The brackets 8 and 13 are preferably removably attached to their respective frame members and to the crossmember 4. It will of course be understood that the mounting brackets 8 and 13 could be modified in configuration or eliminated entirely and the crossmember 4 attached directly to the frame members 7 and 12.

Associated with the chassis formed by frame members 7 and 12 is appropriate running gear including a wheel and spring assembly 14 associated with frame member 7, and a wheel and spring assembly 16 associated with frame member 12. The running gear includes a rear axle housing 17 at opposite ends of which are appropriately shackled springs 18 and 19, opposite ends of the springs being shackled in a conventional manner to frame members 7 and 12 through appropriate shackles 21 and 22. Mounted on opposite ends of the axle housing 17 are wheels 23 and 24 as shown.

Spring assemblies 18 and 19 are secured to the associated ends of axle housing 17 by U-bolts 26 and 27 engaging compression plates 28 and 29, respectively. The compression plate 28 is provided with an extension 31, while the compression plate 29 is provided with an extension 32. Detachably mounted on compression plate extensions 31 and 32 respectively are upwardly extending anchor bolts 33 and 34. The anchor bolts are preferably provided with rubber grommets 36 interposed between the metallic anchor bolts and the metallic compression plates so as to eliminate metal-to-metal contact.

The rubber grommets may be of the type that are vulcanized to the associated metallic parts, or they may be annular in configuration and adapted to clip through an aperture in the associated compression plates while circumscribing the lower end portion of each of the anchor bolts. Suitable nuts 37 threadedly engaged the lower ends of the anchor bolts to detachably retain the anchor bolts secured to the compression plates.

At their upper ends, the anchor bolts are provided with similar rubber grommet assemblies 38 and 39, respectively, the grommets being arranged to resiliently engage and bind on lugs 41 and 42 as shown. The lug 41 constitutes a projection formed on one end 43 of a stabilizer beam 44. The lug 42, on the other hand, forms an extension on the lower end 46 of a beam 47.

Referring specifically to beam 44, the end thereof opposite end 43 is provided with a pair of links 48 suitably attached at one end to the associated end of the beam, and at their other ends pivotally attached to the crossmember 4 by a suitable pin 49. With respect to beam 47, the end thereof remote from end 46 is provided with a similar linkage 51 attached in similar manner through a pivot pin 52 to the crossmember 4 adjacent its end 6.

In the arrangement illustrated in FIG. 1, and more specifically illustrated in FIGS. 3 and 4, the beams 44 and 47 are slidably and pivotally interconnected intermediate their ends by a slide bearing 53 slidably working on beam 47, and a bearing 54 having a transversely extending stud shaft 56 pivotally engaging a complementary socket 57 formed in the slide bearing. As shown in the drawings, the slidable and pivotal interconnection is effected without weakening the beams inasmuch as the stud shaft is disposed between the beams and does not extend through them.

It will thus be seen that when centrifugal or other force is imposed on the vehicle chassis, as illustrated in FIG. 5, frame member 7 will tend to move toward the wheel assembly 14, while the opposite frame member 12 will tend to move away from the wheel assembly 16. Because of the interconnection of beams 44 and 47 by the interconnecting means 53-54, and the respective interconnection of the ends of the beams to the associated frame members and running gear, any actual movement of frame member 7 toward wheel assembly 14 will impose a bending moment on beam 47 which, because of its interconnect with beam 44 will be transferred to beam 44 at about its midpoint, with the result that a downward force will be exerted on pivot pin 49, thus tending to restrict the divisive force imposed between frame member 12 and wheel assembly 16. Similarly, the force factor of such bending moment will tend to restrict or impeded movement of frame member 7 toward its respective wheel assembly 14, thus effecting a stabilization of the vehicle frame 7-12 with respect to the wheel assemblies 14-16.

In the embodiment illustrated in FIGS. 1, 2 and 3, the arrangement is such that axial thrust imposed on beams 44 and 47 is resisted by the inherent resilience or modulus of elasticity of anchor bolts 33 and 34. It will of course be obvious that the method of interconnection between the running gear 14 and beam 44 may be as illustrated in FIG. 11, while the interconnection of the opposite end of the beam to crossmember 4 may be as illustrated in FIG. 12. Referring specifically to FIG. 11, the compression plate 31 supports a clevis 61 to which is pivotally connected the lug 62 secured to the end of beam 44. With respect to the embodiment illustrated in FIG. 12, the crossmember 4 supports a bearing lug 63 to which is pivotally connected a shackle link 64. A lug 66 secured on the end of beam 44 is pivotally connected to the shackle link as shown.

It will of course be obvious that the connecting means illustrated in FIGS. 11 and 12 may be used in conjunction with both beams 44 and 47. With this arrangement, a tendency toward disalignment of the chassis with respect to the running gear, as illustrated in FIG. 5, will still impose a bending moment on the beams, but any axial thrust with respect to beams 44 and 47 will be accommodated by pivotal displacement at the ends of the beams rather than by a resilient displacement of the anchor bolts 33 and 34.

In the embodiment of the invention illustrated in FIG. 8, the structure has been arranged to perform a stabilizing function through the additional effects of torsional forces imposed on the beams, as well as a bending moment imposed on such beams.

As shown in FIGS. 8 and 9, the beams may conveniently be interconnected intermediate their ends in a manner similar to the interconnecting means illustrated in FIG. 1, which interconnection means provides both a pivotal and slidable union between the beams. Preferably, however, the interconnecting means used for the embodiment illustrated in FIGS. 8 and 9 corresponds to the interconnecting means designated generally by the numeral 71 in FIG. 10, which includes a slide bearing 53 slidably disposed on beam 47 as in FIG. 1, cooperating with a second slide bearing 72 slidably disposed on beam 44.

As in the embodiment illustrated in FIG. 1, a stud shaft 56 is provided pivotally engaged in a socket 57 to effect a pivotal interconnection between the slide bearings 53 and 72. The mode of operation of the interconnecting means illustrated in FIG. 10 is in most respects similar to the mode of operation of the interconnecting means illustrated in FIG. 1, the principal difference being the floating nature of the interconnecting means 71 and its ability to accommodate its position along the beams 44 and 47, depending upon the magnitude of forces tending to cause disalignment between the chassis and running gear.

In the embodiment of the invention illustrated in FIG. 8, each of the beams have been provided with an axially extending crank arm portion 76 suitably secured in an anchor block 77 which may include a suitable bearing, or which may include a rubber grommet resiliently trapping the associated end of the crank portion 76 so that vertical forces imposed on the crank arm 76 through the associated pivotal connection of the beam will impose a torsional force on the beam in addition to a bending moment. It will of course be obvious that the proportions of the parts may be altered and selected to accommodate various weights of cars, and to provide various degrees of stiffness in the stabilizing effect of the stabilizer device.

Illustrative of the dimensions of one embodiment which has demonstrated satisfactory results, and referring specifically to the embodiment illustrated in FIG. 1, it has been found that positioning the pivot pins 49 and 52 associated with links 48 and 51 approximately 26 inches apart and symmetrical with respect to the midpoint of crossmember 4, while spacing the connection of lugs 41 and 42, respectively, from pivot pins 49 and 52 approximately 5 ½ inches produces the desired stabilizing effect. Such a stabilizing assembly, mounted immediately behind the rear axle housing, has been observed to stabilize the vehicle upon cornering and to increase traction of the tires with the pavement upon such cornering. Additionally, it has been found that there is a lesser tendency of the running gear of a vehicle equipped with such a stabilizing device to drop into a chuckhole, or to transmit impact shocks to the vehicle chassis from other types of irregularities in the roadbed.

Figure 6:
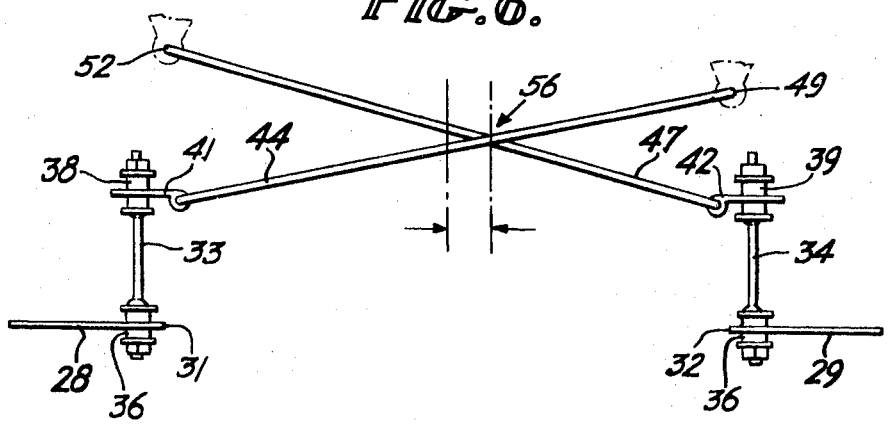
FIG. 6 is a schematic illustration similar to FIG. 5 but showing the relationship of the beams to each other and to the associated chassis and running gear resulting from a turn to the left if the beams are unconnected intermediate their ends.
Figure 7:
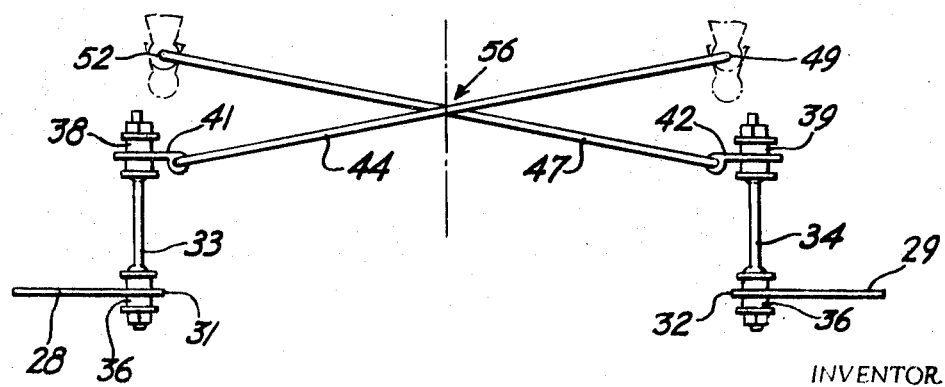
FIG. 7 is a schematic view showing the squatting effect on the chassis when the crossed beams are pivotally and slidably interconnected intermediate their ends in accordance with this invention. The position of the parts in full lines illustrates the position of the parts under normal conditions. The position of the parts illustrated in dash lines lines is the position assumed by the parts when centrifugal force has been imposed tending to effect a disalignment between the chassis and running gear.

In operation, when forces are imposed on the chassis in a manner tending toward realignment of the chassis with respect to the running gear as illustrated in FIGS. 5 and 6, the lower ends 43 and 46, respectively, of beams 44 and 47 will remain essentially stationary with respect to the running gear and associated roadbed while the upper ends of beams 44 and 47 will tend to move in a scissoring action downwardly toward the running gear and roadbed, thus causing the chassis to squat so as to increase traction between the wheels and the roadbed.

When forces are imposed in a direction as indicated in FIG. 5, the upper end of beam 47 will have imposed on it a force correlated to the weight of the vehicle and the centrifugal force imposed by the speed of cornering. Such force imposed on the upper end of beam 47 will impose a bending moment on beam 47, which force will be transmitted through the stud shaft 56 to the bearing 54 and consequently to the beam 44. It should be noted that for all intents and purposes the beam 47 may be considered as pivoted at its lower end on lug 42 while the force is being imposed at its upper end through pin 52.

Thus, the entire length of beam 47 forms the effective length so far as leverage is concerned, with the effective stabilizing component of the force imposed on beam 47 being transmitted to the approximate midportion of beam 44 through stud shaft 56. In the embodiment illustrated in FIG. 1 this imposition of force between the ends of beam 44 remains constant insofar as its point of application is concerned. In this respect, the mode of operation of the embodiment illustrated in FIG. 1 differs from the embodiment illustrated in FIG. 10 in that the interconnecting means 71 illustrated in FIG. 10 will tend to shift its position toward the opposite side of the frame from which the force is imposed on beam 47.

Thus, when forces are imposed as illustrated in FIG. 5, tending to move frame member 7 toward wheel assembly 14, the interconnecting means 71 will shift to the left, while simultaneously exerting a strong downward force on the end of beam 44 attached to frame 12. When forces are imposed as indicated in FIG. 6, movement of the frame member 12 toward the wheel assembly 16 will cause the connecting means 71 to shift to the right. The amount by which the interconnecting means 71 will shift is of course dependent upon the magnitude of the forces tending to cause unsymmetrical disalignment of the chassis 7–12 with wheel assemblies 14–16.

Having thus described my invention, what is claimed to be novel and sought to be protected by letters patent is as follows:

I claim:

1. In combination with a vehicle chassis having a pair of rigidly interconnected spaced frame members and running gear including a pair of wheels and a suspension system for each wheel operatively associated with an associated frame member to accommodate relative movement therebetween, a stabilizer device comprising:
    a. a pair of juxtaposed elongated beams, each beam of the pair having one end thereof anchored to an associated one of said frame members and its other end anchored to the running gear associated with the other frame member of the pair; and
    b. means interconnecting said beams intermediate their ends without weakening the beams whereby movement of one of said frame members toward or away from its associated running gear will impose a substantially corresponding movement between the opposite frame member and its associated running gear;
    c. said means interconnecting said beams intermediate their ends including a slide bearing slidably disposed on at least one of said beams and slidable therealong to accommodate shifting of the pivotal axis of the beams.

2. The combination according to claim 1, in which said means interconnecting said beams intermediate their ends comprises a stud pivotally disposed between not through said beams.

3. The combination according to claim 1, in which said means interconnecting said beams intermediate their ends includes a stud shaft on one of said beams and a slide bearing on the other of said beams, said stud shaft engaging said slide bearing without extending through the associated shaft to permit relative pivotal movement between said beams.

4. A stabilizer device for a vehicle having a pair of rigidly interconnected spaced frame members and running gear including a pair of wheels and a suspension system for each wheel operatively associated with an associated frame member to accommodate relative movement therebetween comprising:
    a. a pair of juxtaposed elongated beams, each beam of the pair having one end thereof adapted to be anchored to an associated one of said frame members and its other end adapted to be anchored to the running gear associated with the other frame member of the pair; and
    b. means interconnecting said beams intermediate their ends whereby movement of the associated ends of said beams toward or away from each other will effect a corresponding movement between the opposite ends of said beams, said means interconnecting said beams intermediate their ends including a slide bearing on one of said beams, a stud shaft on the other of said beams, and a socket in said slide bearing to receive said stud shaft so as to pivotally and slidably interconnect said beams intermediate their ends.

5. The combination according to claim 4, in which the end of each beam adapted to be anchored to an associated one of said frame members constitutes a crank arm whereby relative movement between the associated frame member and running gear imposes a torsional stress on said beam.